Patented Sept. 15, 1953

2,652,377

UNITED STATES PATENT OFFICE 2,652,377

PRODUCTION OF SOLUTIONS OF FORM-
ALDEHYDE-UREA REACTION PRODUCTS

Mearl A. Kise, Portsmouth, Va., assignor to Allied
Chemical & Dye Corporation, New York, N. Y.,
a corporation of New York No Drawing. Application June 12, 1951,
Serial No. 231,250

4 Claims. (Cl. 260—29.4)

This invention relates to a process for the production of a stable liquid formaldehyde-urea reaction product which may be stored and shipped at atmospheric temperatures without throwing down insoluble material which would interfere with its handling or later use. It is another characteristic of the liquid products of this process that they contain the formaldehyde and urea in a form in which at least a part of the formaldehyde is chemically combined with the urea, but is combined in such manner that the materials are readily converted into resinous products of the nature of adhesives or molding powders having the properties demanded by the trade, and obtained by procedures similar to those now known for making formaldehyde-urea resins starting with the separate constituents, e. g. starting with aqueous solutions of formaldehyde and solid or concentrated solutions of urea.

An important practical advantage of the products prepared by the process of my invention is that they provide a means for storing and shipping formaldehyde and urea in the form of a highly concentrated liquid. Present practice is to prepare aqueous solutions of formaldehyde containing about 37% formaldehyde by weight and to ship these separately from the place of manufacture to the purchaser. The major portion of the shipping cost of these solutions is represented by the carriage costs for their water content. Further, in these aqueous solutions the formaldehyde has a strong tendency to undergo reactions and it has been customary to include of the order of 8–10% or more methanol in the formaldehyde solutions to inhibit these undesired reactions in the formaldehyde. This inclusion of methanol increases the costs of the formaldehyde, without compensating benefit to the user.

It is an object of my invention, therefore, to provide a practicable, economic process for the conversion of formaldehyde and urea into a stable liquid product containing 60% or more, preferably 80% to 90%, total solids calculated as formaldehyde and urea and the remainder water in which this solids content is soluble at atmospheric temperatures. These products are mobile fluids at room temperatures which may be readily pumped or readily flow by gravity from one container into another. They are true solutions and may be made more fluid by warming or adding water. They differ from resin gels or glasses of comparable water content which, although frequently clear, are solids in the sense that a mass of these gels or glasses may be broken up into separate particles which retain their particle character at room temperature for long periods of time, whereas the compositions of my invention are coalescent, mobile liquids at room temperatures, although those with the lower water contents are relatively viscous.

These stable solutions are particularly useful because of their high concentration of formaldehyde-urea reaction products which are not resins but are essentially the chemical equivalents of urea and formaldehyde insofar as concerns their forming resins when suitably treated. For example, it is well known to produce hard, insoluble resins by heating an aqueous, acidic solution of urea and formaldehyde in a mol ratio of about 1.5:1. Similar resins may be prepared by diluting with water the products of my invention, if necessary, to obtain a solution of the desired formaldehyde concentration, adding urea to bring the formaldehyde-urea ratio to 1.5:1, and after adjusting the pH to the desired point by addition of acid, treating the solution in the same general way as solutions of urea and formaldehyde heretofore have been treated to form the desired resins therefrom. Thus, the products of my invention may be treated under conditions with respect to concentrations and ratios of formaldehyde and urea, temperature, pH of reaction mixture, etc. heretofore employed for treating formaldehyde-urea solutions to obtain desired resins.

In carrying out the process of my invention, a 30% to 50% aqueous formaldehyde solution is one of the starting materials. This may be a commercial methanol-inhibited solution, containing about 10% methanol to inhibit polymerization of the formaldehyde, or an uninhibited formaldehyde solution. I prefer to use an uninhibited formaldehyde (i. e. one containing 1.5% or less methanol). Urea is added to the aqueous formaldehyde solution and dispersed in the aqueous solution at temperatures below 60° C. The urea is mixed with the formaldehyde in amount such that the mol ratio in the mixture is in the range 4.4 to 7.3 mols formaldehyde for every 1 mol urea, preferably in the range 4.6 to 5.9 mols formaldehyde per mol of urea.

The acidity of the reaction mixture is adjusted to a pH in the range 8.8 to 9.5, preferably to a pH 8.8–8.9. This adjustment may be accomplished by adding an alkali to the aqueous formaldehyde solution, prior to the addition thereto of the urea, to bring the pH of that solution to a point such that after dispersion of the urea therein, the resulting reaction mixture will have the required alkalinity. For example, employing urea obtained from one commercial source, by neutralizing the free acid generally present in aqueous formaldehyde solutions and increasing the pH of the solution to 8.5 to 9.2 by addition of a non-volatile, strongly basic material such as sodium hydroxide or other alkali metal hydroxide, following addition of the urea the reaction mixture has a pH of 8.8 to 9.5. Operating in this manner (adjusting the pH of the formaldehyde solution) any necessary further adjustment in the pH of the reaction mixture may be made by addition of strong alkaline material or a strong acid to the reaction mixture as initially prepared. Instead of adding the alkali to the formaldehyde solution, after mixing that solution with the urea the amount of alkali or acid necessary to bring the pH of the reaction mixture to the required value may be added to the mixture.

The reaction mixture thus prepared is heated at temperatures within the range 30° to 60° C. for at least 15 to 30 minutes. Following this preliminary reaction step, water is distilled from the mixture until the liquid residue of the evaporation contains 60% to 90%, preferably 80% to 85%, total solids. This solids content is calculated in terms of formaldehyde and urea and is based on analysis of the distillation residue for carbon and nitrogen. By this evaporation the formaldehyde-water ratio in the product is increased to a value in the range 1 to 6.9 parts formaldehyde by weight for every 1 part of water from an initial ratio in the range 0.43 to 1 part by weight formaldehyde to very 1 part water.

Heating of the reaction mixture during the evaporation step serves to further the reaction of the urea and formaldehyde. Accordingly, the time and temperature of the reaction and evaporation steps together function to carry the reaction of the urea and formaldehyde to the desired degree. When a batch distillation is employed, a minimum reaction period of 15 minutes at a temperature within the range 30° to 60° C. followed by evaporation at 45° to 60° C. over a minimum period of about one hour provide suitable reaction conditions. Employing a film or "flash" evaporation procedure, with its characteristic short period of exposure of the liquid to the heated evaporator surfaces, a minimum reaction period of 15 minutes at about 50 to 60° C. or a progressively longer period at lower temperatures, increasing to about 30 minutes at 30° to about 35° C., provide suitable reaction conditions. These represent the minimum conditions for time and temperature of heating the urea-formaldehyde solution during the reaction and evaporation steps in carrying out the process of my invention.

There is no maximum limit to the time during which the aqueous solution of urea and formaldehyde may be heated so long as the formaldehyde-water ratio in the solution is no greater than 0.67. On the other hand, when more concentrated solutions in which the formaldehyde-water ratio is greater than 0.67 are being heated at temperatures in the range 30° to 60° C., such as occurs when formaldehyde solutions containing more than 40% formaldehyde by weight are employed in making up the mixture, or later during the evaporation of the reaction mixture to concentrate it to obtain the final product of my process, the time of heating such solutions is limited to a maximum no greater than about 14 hours.

The evaporation of the aqueous formaldehyde-urea reaction mixture is carried out at temperatures of about 45° to 60° C. and under reduced pressures below atmospheric such that the water is vaporized at those temperatures. In general, this entails evaporating the water under pressures no higher than 70 mm. of Hg (abs.) pressure. Preferably, I prefer to carry out the evaporation of the water under reduced pressures of 50 to 65 mm. of Hg, to evaporate the water at temperatures of 45° to 60° C.

The evaporation is carried out by simple distillation (simple batch distillation or continuous equilibrium evaporation such as flash distillation) until the liquid residue of the evaporation contains 60% to 90%, preferably 80% to 85%, total solids (calculated in terms of formaldehyde and urea based on analysis of the residue for carbon and nitrogen) and has a pH of at least 8.0 as measured at the time it is prepared and before standing for a prolonged period of time during which its acidity substantially increases. Loss of formaldehyde with the water taken overhead during this evaporation is limited to obtain a residue containing 4.0 to 6.5, preferably 4.2 to 5.2, mols of formaldehyde per mol of urea. This is accomplished by distilling the required quantity of water from the reaction mixture at a rapid rate, such that at least 0.05% of the charge is vaporized and taken off as distillate per minute. Employing a simple batch distillation, the amount of distillate carried overhead per minute preferably amounts to about 0.7–0.8% by weight of the aqueous charge subjected to the distillation. Employing a film distillation procedure, in which the solution is evaporated while flowing in thin layers over heat transfer surfaces completely wetted by the solution, the required quantity of water is more rapidly vaporized or "flashed" off in a short period of contact of the reaction mixture with the heat transfer surfaces of about 10 seconds average time of passage of the solution over the heat transfer surfaces in the film evaporator. Thus, both in the batch distillation under preferred conditions and in the film distillation, the water is evaporated at a rate such that the distillate carried overhead per minute amounts to at least about 0.7% by weight of the aqueous charge to the evaporation step.

The stable, liquid products obtained by my aforedescribed process may be stored or shipped without throwing down solids interfering with their handling or use. In referring to such solutions as stable, I means solutions which when kept at room temperatures (of the order of 25–30° C.) remain clear liquids for a period of at least two months. In general, the products of my preferred process remain clear liquids for periods of about six months. Adjustment of the reaction mixture to proper alkalinity before reaction of the urea and formaldehyde takes place to a substantial degree is particularly important to insure stability of the product. Some leeway is, of course, permissible in adjusting the conditions of the process but the pH values should not depart substantially from those set forth above, particularly when other conditions are maintained close to the extremities of their ranges. For example, when conditions maintained are near the lower extremities of the ranges for pH values and mol ratio of formaldehyde to urea in the final product and the reaction mixture is concentrated to a total solids content near the upper extremity of the range previously described, in some cases the product may show signs of turbidity developing towards the end of the two months storage period.

The ratio of formaldehyde to urea in the product of my process is determinable by analyzing the product for its carbon and nitrogen contents and calculating from these, in the customary manner, the corresponding amounts of formaldehyde and urea. The water content is determined by subtracting the sum of the formaldehyde and urea percentages from 100.

The following examples are illustrative of my invention:

*Example 1.*—To a 37% aqueous formaldehyde solution containing less than 1.5% methanol sufficient 1-N caustic soda solution is added to increase the pH of the formaldehyde solution to 8.6–8.7. By thus incorporating with the formaldehyde solution sufficient caustic soda to neutralize its acid content and to provide an excess thereover of about 0.007% by weight NaOH based on total weight of the formaldehyde solution plus the urea thereafter added, the desired adjustment in pH of the reaction mixture is obtained with the particular urea used in carrying out this example; a commercially pure urea. The alkaline aqueous formaldehyde solution is warmed to 30° C. and sufficient crystalline urea to give a formaldehyde to urea mol ratio of 4.6:1 in the reaction mixture is added with stirring to dissolve the urea in the solution. The reaction mixture, having a pH of about 8.9–9.0, is heated at 50° to 55° C. for one to two hours and evaporated under 50 mm. of Hg pressure in a tubular film evaporator through which the liquid passes over the heat transfer surfaces in about 10 seconds to evaporate and take off as overhead distillate vapors about 47% by weight of the charge to the evaporator. Under these conditions the temperature of the reaction mixture being evaporated is about 50°–55° C.

The product drawn from the film evaporator is a clear, aqueous solution of formaldehyde-urea reaction product, containing about 80–85% by weight total solids and 4.4–4.5 to 1 mol ratio of formaldehyde to urea. It is stable for storage periods of at least two months at room temperature. The overhead vapors, essentially composed of water and formaldehyde, contain about 3% by weight formaldehyde.

By dissolving in the liquid product of this example urea in amount sufficient to reduce the formaldehyde-urea ratio to, for example, 1.5 mols formaldehyde for every 1 mol urea, a reaction mixture is prepared which may be treated in manners similar to those known to the art to produce molding powders.

*Example 2.*—To a 37% by weight aqueous solution of formaldehyde substantially free from methanol sufficient 1-N sodium hydroxide solution is added to neutralize the free acidity and to provide an excess of caustic soda amounting to 0.007% by weight of the aqueous formaldehyde and of the urea later added to this formaldehyde solution. This caustic soda addition increases the pH of the formaldehyde solution to about 8.65.

To the alkaline formaldehyde solution there is added and dissolved therein sufficient urea to provide 4.6 mols of formaldehyde for every 1 mol of urea. The reaction mixture thus prepared, having a pH of about 8.9–9.0, is maintained at 30° C. for one-half hour and is then concentrated by simple batch distillation under a pressure below atmospheric of 50 mm. Hg. The distillation vessel employed for this evaporation is heated sufficiently to drive over as the overhead distillation vapors about 42% of the still charge in a period of about 95 minutes. This corresponds to an evaporation rate of 0.44% of the charge per minute. The material thus distilled is concentrated until the still residue contains about 75.1% by weight total solids in a mole ratio of formaldehyde to urea of 4.12 to 1 and has a pH of 8.52. Product thus prepared remained a clear liquid during storage over a period of two months at room temperatures.

*Example 3.*—Illustrative of the long reaction periods permitted in treating reaction mixtures containing a formaldehyde-water ratio no greater than 0.67 to 1 by weight, the procedure of Example 2 may be modified to heat for 17 hours at 30° C. the reaction mixture initially prepared containing a formaldehyde-water ratio of 0.59 to 1 by weight. Following concentration of this solution by evaporating it until the evaporation residue contains about 85% total solids and a mol ratio of 4.01 formaldehyde to 1 urea, a product with a pH of 8.45 is obtained which remains a clear liquid over two months storage at room temperatures.

*Example 4.*—The procedure of Example 2 is modified to mix the urea with the alkaline aqueous formaldehyde solution in amount providing a ratio of 5.5 mols formaldehyde for every 1 mol urea. After an initial reaction period of six hours at 30° C., the reaction mixture is concentrated by a simple batch distillation under 50 mm. of Hg until the residue of the distillation contains 81.4% by weight total solids. Product thus prepared contained 4.62 mols formaldehyde per mol of urea, had a pH of 8.45 and remained a clear liquid when stored over a period of two months at room temperatures.

A product which is stable and remains clear over two months storage is also obtained by modifying the procedure described in Example 2 to incorporate the urea with the alkaline formaldehyde solution in the proportions of 7.0 mols formaldehyde to 1 mol urea and to carry the evaporation of the reaction mixture, following the preliminary reaction period of six hours, to the point at which the residue of the evaporation contains 85.3% total solids. Product thus obtained contained 5.41 mols formaldehyde per mol of urea, had a pH of 8.55, and was stable during storage at room temperature over a two month period.

I claim:

1. The process for the production of a stable, aqueous solution of formaldehyde-urea reaction products which comprises incorporating with an aqueous formaldehyde solution containing from 30% to 50% by weight formaldehyde, at a temperature no higher than 60° C., urea in amount such that the resulting mixture contains a mol ratio of 4.4 to 7.3 mols formaldehyde for every 1 mol urea, adjusting the pH of the reaction mixture thus prepared to within the range pH 8.8 to 9.5 and thereafter heating said reaction mixture at temperatures in the range 30° C. to 60° C. for at least 15 minutes, thereafter evaporating water from said mixture by simple distillation at temperatures in the range of about 45° to 60° C. under reduced pressure below atmospheric at which water is vaporized from the mixture until the liquid residue of the evaporation contains 60% to 90% by weight total solids, the periods of time of initially heating the reaction mixture and thereafter of evaporating water therefrom being so correlated with the temperature at which the reaction mixture is initially heated that when the period of evaporation at 45° to 60° C. is substantially less than one hour, the reaction mixture is initially heated for a period of at least 15 minutes at about 50° to 60° C. and for progressively longer periods at lower temperatures which increase to at least about 30 minutes at temperatures of 30° to about 35° C., when said reaction mixture contains a concentration of formaldehyde, urea and water such that the formaldehyde-water ratio is greater than 0.67:1, further limiting the time of heating it at temperatures in the range 30° to 60° C., including the time it is at said temperatures while evaporating water therefrom, to no more than about 14 hours, and during said evaporation of water limiting the loss of formaldehyde from the liquid undergoing distillation by rapidly distilling said liquid to form a residue containing 4.0 to 6.5 mols formaldehyde for every 1 mol urea.

2. The process of claim 1, wherein the following incorporating the urea with the aqueous formaldehyde solution and adjusting the pH of the reaction mixture, said reaction mixture is heated first at temperatures in the range 30° to 60° C. for at least 15 minutes, and thereafter water is evaporated from said reaction mixture by a simple batch distillation at temperatures in the range 45° to 60° C. over a period of at least one hour and at a rate such that the distillate carried overhead per minute amounts to at least 0.05% by weight of the aqueous charge to the evopration step.

3. The process of claim 1, wherein the first heating of the reaction mixture is under correlated conditions of time and temperature such that for temperatures of about 50°-60° C. the time of heating is at least 15 minutes and for lower temperatures this minimum time is increased to at least 30 minutes for temperatures of 30°-35° C., and thereafter water is evaporated from the mixture by film distillation at temperatures in the range 45°-60° C.

4. The process for the production of a stable, aqueous solution of formaldehyde-urea reaction products which comprises incorporating with an aqueous formaldehyde solution containing no more than 1.5% methanol and from 30% to 50% by weight formaldehyde, at a temperature no higher than 60° C., urea in amount such that the resulting mixture contains a mol ratio of 4.6 to 5.9 mols formaldehyde for every 1 mol urea, adjusting the pH of the reaction mixture thus prepared to 8.3–8.9 and thereafter heating said reaction mixture at temperatures of 30° to 60° C. for one to two hours, thereafter rapidly evaporating water from the mixture at temperatures in the range about 45° to 60° C. at a rate such that the distillate carried overhead per minute amounts to at least about 0.7% by weight of the aqueous charge to this evaporation step, and recovering a liquid residue of the evaporation, having a pH of at least 8.0, containing 80–85% by weight total solids and 4.2 to 5.2 mols formaldehyde for every 1 mol urea.

MEARL A. KISE.

References Cited in the file of this patent

UNITED STATES PATENTS

| Number | Name | Date |
|---|---|---|
| Re. 23,174 | Kvalnes | Nov. 29, 1949 |
| 2,485,203 | Kvalnes | Oct. 18, 1949 |

FOREIGN PATENTS

| Number | Country | Date |
|---|---|---|
| 952,656 | France | May 2, 1949 |